March 20, 1951 W. H. DOHERTY 2,545,544

IMPEDANCE MONITOR

Filed Dec. 9, 1949

INVENTOR
W. H. DOHERTY
BY B. F. Stoddard
ATTORNEY

Patented Mar. 20, 1951 2,545,544

UNITED STATES PATENT OFFICE 2,545,544

IMPEDANCE MONITOR

William H. Doherty, Summit, N. J., assignor to Bell Telephone Laboratories, Incorporated, New York, N. Y., a corporation of New York Application December 9, 1949, Serial No. 132,045

8 Claims. (Cl. 250—17)

This invention relates to an impedance monitor for detecting a mismatch between the impedance of a coaxial transmission line and the impedance of its associated load circuit and, more particularly, to a null detector circuit for monitoring the input impedance of a coaxial transmission line extending from a low frequency radio transmitter to its associated antenna load circuit.

In a low frequency radio transmitting system, the output tuned circuits of the transmitter are ordinarily coupled to the associated antenna load circuit by a coaxial transmission line. In order to obtain maximum power output from the system, the coaxial transmission line is usually terminated in its characteristic impedance by adjusting suitable tuned circuits in the antenna load circuit so as to match the impedance of the load circuit with the impedance of the transmission line. However, during operation of the system, various trouble conditions are liable to occur on either the line or in the antenna circuit with the result that the impedance of the line and the impedance of the antenna circuit become mismatched. The occurrence of such an impedance mismatch during operation of the system is undesirable as it impairs the power transmission efficiency of the system due to the fact that an amount of power proportional to the degree of mismatch will be reflected back over the line and will produce standing waves on the line. Such a condition can be detected by observing the input impedance of the coaxial transmission line because, when the line is terminated in its characteristic impedance, its input impedance can be considered as being a pure resistance equal in value to the surge impedance of the line whereas, when an impedance mismatch occurs, the value of the input impedance of the line will be changed.

Accordingly, it is an object of this invention to provide an impedance monitor for detecting the occurrence of a mismatch between the impedance of a coaxial transmission line and the impedance of its associated load circuit.

Another object of this invention is to provide an impedance monitor for obtaining an indication representative of the magnitude of a change in the input impedance of a coaxial transmission line.

An additional object of this invention is to provide a null detector circuit for monitoring the input impedance of a coaxial transmission line extending from a radio transmitter to an antenna load circuit.

These and other objects of the invention are accomplished by employing improved means for obtaining a sample of the voltage across the coaxial line and a sample of the current fed into the line. These two samples are balanced against each other in a null detector circuit having means for indicating any change in the vector ratio of the samples, the magnitude of the change being representative of the magnitude of the impedance change in the line or load circuit.

The specific means for obtaining samples of the line voltage comprises a hollow tubular inductance coil having one end connected to the hollow tubular inner conductor of the coaxial line and having its other end connected to ground. Samples of the current fed into the line are obtained by threading a wire inductance coil through the hollow tubular inductance coil and also through a loop in the hollow tubular inner conductor of the coaxial line. The tubular inductance coil is coupled to the input of a rectifier by a high resistance and the wire inductance coil is coupled to the input of the same rectifier by a capacitor. The current through the resistor is in phase with the line voltage and is proportional to it and the current through the capacitor is opposite in phase to the line current and is proportional to it. The resultant of these two currents is rectified by the rectifier and is then supplied to a direct-current meter.

When the input impedance of the antenna coupling circuit is equal to the characteristic impedance of the coaxial transmission line, the current sample and the voltage sample will cancel each other in the rectifier and the meter will indicate zero. Any departure of the impedance of the transmission line or the impedance of the antenna load circuit from their proper values will produce an unbalance of the sample currents applied to the rectifier. The magnitude of the resulting rectified current will be indicated on the meter. This unbalance current can also be employed to energize a protective relay for preventing the application of the transmitter output energy to the transmission line during the time that the unbalance condition exists thereby avoiding damage to the line or to the antenna circuit.

These and other features of the invention are discussed more fully in connection with the following detailed description of the drawing in which.

Figure 1:
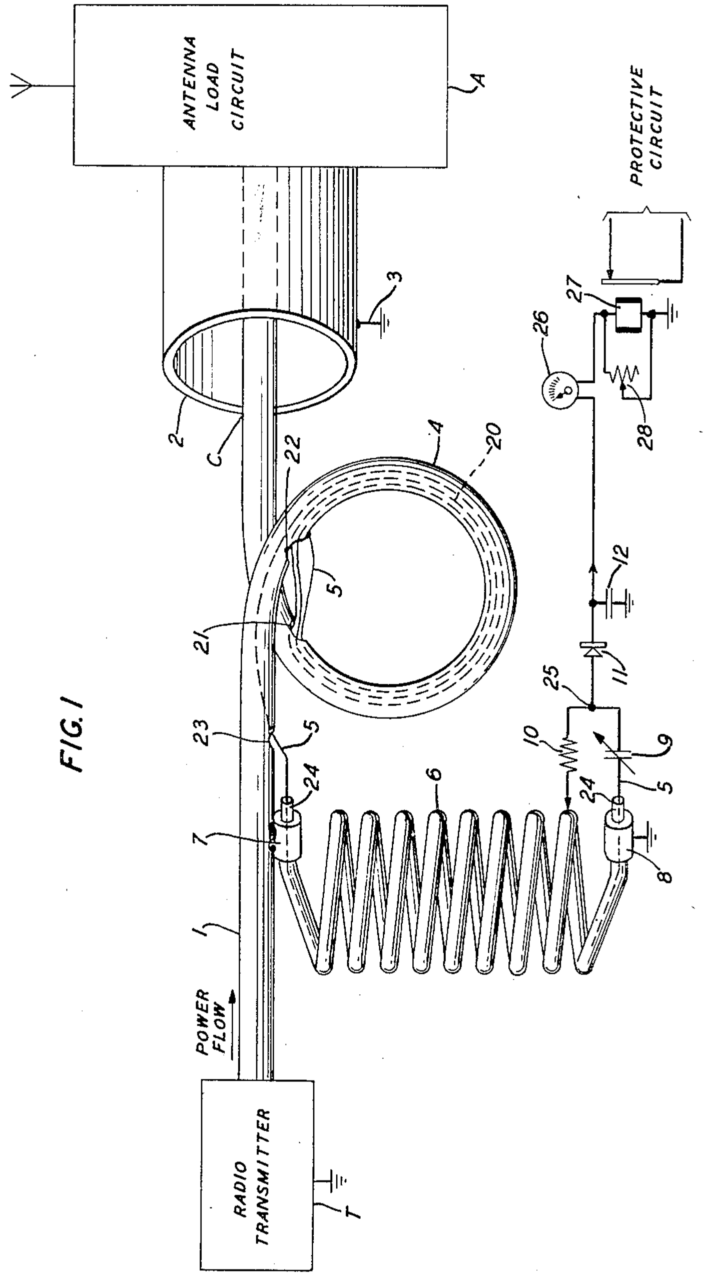
Fig. 1 shows a null detector circuit applied to a transmission system for obtaining current and voltage samples therefrom.

In Fig. 1, a conventional low frequency radio transmitter T is shown to be connected to its associated antenna load circuit A by a coaxial transmission line C comprising a hollow tubular inner conductor 1 and a hollow tubular outer conductor 2 which is connected to ground by a strap 3. The inner conductor 1, which may be made of copper, extends outwardly beyond the end of the outer conductor 2 for a short distance. This extended portion of the inner conductor 1 is bent in the form of a small inductance loop 4 to constitute a small reactance across which a potential drop can be produced for the purpose of obtaining samples of the line current. It is desirable that the reactance of the loop 4 be small in comparison with the impedance of the line C in order that the potential at the beginning of the loop 4 shall not differ appreciably in amplitude or phase from the potential at the end of the loop 4. For example, if the coaxial line C has a surge impedance that is between 40 and 75 ohms, it would be satisfactory for the loop 4 to have a reactance of about 1 ohm.

An electrically conductive wire 5 having a covering of any good dielectric material, such as polystyrene, is connected in any appropriate manner, as by soldering, to the input side of the loop 4 and is threaded around through the inside of the loop 4 several times to form an inductance coil 20. Two small holes 21 and 22 are cut in the hollow copper conductor 1 to facilitate the process of threading the wire 5 through the loop 4. After being threaded through the loop 4 several times, the wire 5 is threaded back through the hollow conductor 1 to a point ahead of the input to the loop 4 where it emerges from another hole 23. By thus threading the wire 5 around through the loop 4 several times, it is possible to obtain a radio frequency potential considerably higher than the actual radio frequency potential across the loop 4. For example, if the loop 4 has a reactance of 1 ohm, as was mentioned above, and if the current flowing in the conductor 1 is 25 amperes, then the radio frequency potential across the loop 4 would be 25 volts which would be multiplied, by threading the wire 5 three times around through the loop 4, to produce a radio frequency potential of 75 volts at the point where the wire 5 emerges from the hole 23. Thus, the loop 4 and the coil 20 constitute the primary and secondary windings, respectively, of a step-up transformer.

The advantage residing in the special constructional design of this step-up transformer 4—20 over a conventionally designed transformer having an externally located secondary coil is that the present design provides good shielding of the wire 5 thereby avoiding electrostatic coupling between the primary loop 4 and the secondary coil 20. This advantage becomes particularly important when the invention is used with a high-power transmitter, such as a 50-kilowatt transmitter, because, if a conventional transformer should be used with such a transmitter, there would be voltage breakdowns between the primary coil and the conventional externally located secondary coil. Such voltage breakdowns are avoided by employing the transformer 4—20 described above.

Upon emerging from the hole 23 in the conductor 1, the wire 5 is threaded through a length of hollow copper tubing 24 which is bent in the shape of a helical inductance coil 6. The coil 6 is preferably so constructed as to have an impedance value which is several times as large as the value of the impedance of the coaxial transmission line C thereby preventing loss of energy from the line C to ground. The upper end of the coil 6 is connected electrically to the conductor 1 by means of a clamp 7 and its lower end is connected electrically to ground by means of a clamp 8. At the ground end of the coil 6, the wire center conductor 5 emerges from inside the hollow conductor 24 and is connected electrically to one side of a variable condenser 9. The other side of the capacitor 9 is connected to a junction point 25. At a point near the ground end of the coil 6, the hollow outer conductor 24 is connected electrically to one terminal of a resistor 10 which has its other terminal connected to the junction point 25. The junction point 25 is connected electrically to one side of a rectifier 11 which may be of any suitable type, such as a vacuum tube or a crystal detector. The other side of the rectifier 11 is by-passed to ground for radio frequency energy by means of a condenser 12 and its direct-current output is connected electrically to a meter 26 for the purpose of providing a visible indication of the magnitude of the current flowing through the detector 11.

The circuit described above functions as a null detector circuit in which a sample current proportional to the current fed into the coaxial line C is balanced against a sample current proportional to the voltage across the line C and in which any change in the vector ratio of the sample currents is detected and an indication representative of its magnitude is provided by the meter 26.

Samples of the current fed into the coaxial line C are obtained by means of the step-up transformer constituted by the primary loop 4 and the secondary coil 20 described above. The potential to ground of the wire 5 at the point where it emerges from the hole 23 consists of the potential of 75 volts, mentioned above, plus the potential to ground of the line C, due to the fact that one end of the wire 5 is electrically connected to the inner coaxial line conductor 1. In this example, the potential to ground of the line C is assumed to be 2,000 volts. The potential of the wire 5 with respect to the upper end of the hollow copper tube 24 is only the above-mentioned 75 volts because the tube 24 is also electrically connected to the line conductor 1 and its potential to ground is the same as that of the line conductor 1. Therefore, the coiled concentric line constituted by the wire 5 and the tube 24 will have an input voltage between its inner and outer conductors of only 75 volts which is the induced voltage developed in the transformer 4—20 and which is proportional to the amplitude of the current in line C.

This voltage is transmitted through the coiled concentric line 5—24 and appears at its output as a potential to ground of 75 volts, the 2,000 volts potential to ground having been eliminated or neutralized as the result of passing the wire 5 through the center of the coiled hollow conductor 24. At the bottom end of the coiled concentric line 5—24, the output voltage of 75 volts is impressed on the condenser 9. As the condenser 9 in this example is selected to have a capacitive reactance of 750 ohms, a current of 0.1 ampere will flow to the junction point 25 and this current is to be considered as being a proportional sample of the magnitude of the current fed into the coaxial line C.

Samples of the voltage across the coaxial line C are obtained by connecting the resistor 10 to the coil 6 as was described above. For example, if the voltage across the line C is assumed to be 2,000 volts, as was mentioned above, this voltage being represented by the vector E in Fig. 3, a sample voltage of 200 volts can be obtained by tapping the coil 6 at a point approximately one-tenth of the distance from its lower end. The magnitude of this sample voltage, which is represented in Fig. 3 by the vector $E_E$, can be adjusted by shifting the point at which the resistor 10 is connected to the coiled conductor 24.

Figure 3:
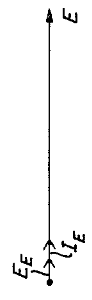
Fig. 3 is a similar vector diagram of the line voltage sample energy.

When the sample voltage $E_E$ is applied to the resistor 10, which in this example is selected to have a resistance of 2,000 ohms, a current of 0.1 ampere, which is represented in Fig. 3 by the vector $I_E$, will flow to the junction point 25. Since the resistance of the 2,000 ohms resistor 10 is many times larger than the reactance of the few bottom turns of the coil 6, the 200 volts potential $E_E$ that is applied to the resistor 10 is a true sample, in respect to phase, of the potential across the total coil 6. Therefore, all three vectors in Fig. 3 are in the same phase and the current produced in the resistor 10 is to be considered as being a proportional sample of the magnitude of the voltage across the coaxial line C.

The voltage developed in the secondary coil 20 of the transformer 4—20 will be in quadrature with the line current in line C and, since the leakage and resistance of the coil 20 is negligibly small due to its special construction, this voltage will appear between the input terminals of the coiled concentric line 5—24. Since the coiled concentric line 5—24 is so constructed that its resistance is negligibly small, the voltage produced by the transformer 4—20 will be transmitted through it without change of phase provided the load impedance at its output end is purely reactive. In order for this load impedance to be considered as being purely reactive, the junction point 25 must be at ground potential. This last requirement is obtained when there is a balance of the currents through condenser 9 and resistor 10 with respect to both phase and magnitude.

As was described above, the magnitudes of the currents in the condenser 9 and the resistor 10 are each 0.1 ampere thus providing a balance in respect to the magnitudes of the sample currents. A precise balance of the magnitudes of these sample currents can be obtained by properly adjusting the point of connection between the resistor 10 and the coil 6 and by adjusting the values of the condenser 9 and the resistance 10. These adjustments should be made with the line C connected to a purely resistive load so that the line voltage and line current will be in phase. The precise balance thus obtained renders the detector circuit quite sensitive so that very small impedance changes can be readily detected.

Since the impedance of the detector arm in any circuit providing a null balance can be regarded, in determining the voltages and currents in the other parts of the circuit, as being zero whenever a true null occurs, the coiled concentric line 5—24 can be regarded as being terminated purely in the reactance constituted by the condenser 9. Since a loss-less transmission line, such as the coiled concentric line 5—24, will not produce a phase shift when it is terminated in a pure reactance, the potential applied to the condenser 9 is of precisely the same phase as that of the input potential of 75 volts applied to the input terminals of the line 5—24, this voltage being in quadrature with the line current in line C as was explained above. The quadrature voltage thus applied to the condenser 9 will produce in the condenser 9 a current which is in phase quadrature with it and which, due to proper poling of the secondary coil 20 of the transformer 4—20, is in phase opposition to the line current in line C.

Figure 2:
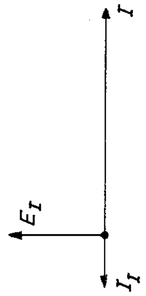
Fig. 2 is a vector diagram of the line current sample energy.

These phase relations are illustrated in Fig. 2 in which the vector I represents the current fed into the line C, the vector $E_I$ represents the potential which is applied from the lower end of the coiled concentric line 5—24 to the condenser 9, and the vector $I_I$ represents the current produced in the condenser 9. As can be seen in Fig. 2, the vector $E_I$ is 90 degrees ahead of the vector I because it represents the potential drop caused by current passing through the positive reactance constituted by the coil 20. Fig. 2 also shows that the vector $I_I$ is 90 degrees ahead of the vector $E_I$ because it represents the flow of current through the negative reactance constituted by the condenser 9 and consequently leads the applied voltage vector $E_I$ by 90 degrees and leads the line current vector I by 180 degrees.

Since the coaxial line C is terminated in its characteristic impedance by adjusting the impedance of the antenna load circuit A to match the impedance of the line C, the input impedance of the line C is purely resistive so that the line current is in phase with the line voltage. This condition is indicated in Figs. 2 and 3 wherein the two transmission line vectors I and E are represented as having the same phase. Comparison of Figs. 2 and 3 shows that, when the two line vectors I and E are in phase, the two sample vectors $I_I$ and $I_E$ are exactly opposite in phase. As the circuit is initially adjusted, in the manner described above, to provide the sample vectors $I_I$ and $I_E$ with equal amplitudes, they will cancel each other in the detector 11 to provide a null balance thereby producing a zero indication on the scale of the meter 26.

When the circuit is thus balanced to provide a null condition in the detector 11, any departure of the impedance of the transmission line C or the impedance of the antenna load circuit A from their proper valves will produce an impedance mismatch which, in turn, will produce a change in the input impedance of the line C which will be detected by the impedance monitor. This is due to the fact that, when an impedance mismatch occurs, the line C is no longer terminated in its characteristic impedance with the result that the vector ratio of the line current I and the line voltage E will be changed. When this change occurs, the two sample vectors $I_I$ and $I_E$ will no longer cancel each other in the detector 11.

These unbalanced sample currents will therefore cause the detector 11 to produce an output current the magnitude of which will be represented by the resulting indication provided by the meter 26. Such an indication by the meter 26 serves as a warning indication that the input impedance of the coaxial transmission line C has changed from its proper value. Since a change in the input impedance of the line C is due to the occurrence of a mismatch between the impedance of the line C and the impedance of its associated load circuit A, as was explained above, the indication given by the meter 26 also serves as a warning that the impedance of the antenna load circuit A should be adjusted to its proper value. This is accomplished by adjusting the tuned circuits, mentioned above, within the antenna load circuit A until the meter 26 again provides a zero indication.

To avoid damage to the line C or to the antenna load circuit A that might be caused by a sudden occurrence of an excessively large impedance mismatch, the unbalance current output of the detector 11 can also be employed to energize a protective relay 27 which can be adapted to disconnect the radio frequency power output of the transmitter T from the line C in a manner similar to that disclosed in Patent 2,066,522 issued to me on January 5, 1937. A rheostat 28 is connected across the winding of the relay 27 for adjusting the sensitivity of the relay 27 so that it will not operate its armature until the magnitude of the unbalance current exceeds a preassigned value representing an excessive impedance mismatch.

What is claimed is:

1. An impedance monitor for monitoring a coaxial transmission line to detect changes in the input impedance thereof, said coaxial line comprising an outer conductor and a hollow inner conductor having an extended portion extending outwardly beyond an end of said outer conductor, said extended portion being bent in the form of a loop, said monitor having voltage sampling means for deriving electric energy that is proportional to the voltage across the coaxial line and also having current sampling means for deriving electric energy that is proportional to the current fed into the coaxial line, said current sampling means including a wire electric conductor and also comprising a transformer having its primary constituted by said loop formed in said extended portion of said hollow inner coaxial conductor and having its secondary constituted by a coil formed by threading said wire conductor through the inside of said looped portion of said hollow conductor.

2. An impedance monitor for monitoring the input impedance of a coaxial transmission line to detect changes thereof, said coaxial line comprising an outer conductor and a hollow inner conductor having an extended portion extending outwardly beyond an end of said outer conductor, said extended portion being bent in the form of a loop, said monitor having voltage sampling means for deriving electric energy that is proportional to the voltage across the coaxial line and also having current sampling means for deriving electric energy that is proportional to the current fed into the coaxial line, said current sampling means including a wire electric conductor and also comprising a step-up transformer having its primary constituted by said loop formed in said extended portion of said hollow inner coaxial conductor and having its secondary constituted by a multiturn coil formed by threading said wire conductor several times around through the inside of said looped portion of said hollow conductor.

3. An impedance monitor for monitoring a coaxial transmission line to detect changes in the input impedance thereof, said coaxial line comprising an outer conductor and a hollow inner conductor having an extended portion extending outwardly beyond an end of said outer conductor, said extended portion being bent in the form of a loop and having a plurality of holes therein, said monitor having voltage sampling means for deriving electric energy that is proportional to the voltage across the coaxial line and also having current sampling means for deriving electric energy that is proportional to the current fed into the coaxial line, said current sampling means including a wire conductor having one end connected electrically to said inner coaxial conductor, said current sampling means also comprising a transformer having its primary constituted by said loop formed in said extended portion of said hollow inner coaxial conductor and having its secondary constituted by a coil formed by inserting the other end of said wire conductor into said hollow conductor through one of said holes and threading it around through the inside of said looped portion of said hollow conductor and out of another of said holes.

4. An impedance monitor for detecting changes occurring in the input impedance of a coaxial transmission line, said coaxial line comprising an outer conductor and a hollow inner conductor extending outwardly beyond an end of said outer conductor, said extended portion of said inner conductor being bent in the form of a loop, said monitor including voltage sampling means for deriving samples of the voltage across the coaxial line and current sampling means for deriving samples of the current fed into the coaxial line, said voltage sampling means comprising a hollow inductance coil having its upper end connected electrically to said extended portion of said inner coaxial conductor, said current sampling means comprising a wire electric conductor threaded through both the inside of said hollow inductance coil and the inside of said looped portion of said hollow inner coaxial conductor, said monitor further comprising a null detector circuit including a rectifier and also including instrumentalities for normally supplying said rectifier with said current and voltage samples in opposite phase and equal magnitudes for normally producing a null condition in said detector circuit.

5. An impedance monitor for detecting changes occurring in the input impedance of a coaxial transmission line, said line comprising an outer conductor and a hollow inner conductor extending outwardly beyond an end of said outer conductor, said extended portion of said inner conductor being bent in the form of a loop for producing a potential drop, said extended portion having a hole therein and said looped portion having two holes therein, said monitor including voltage sampling means for obtaining samples of the voltage across the line and current sampling means for obtaining samples of the current fed into the line, said voltage sampling means comprising a hollow inductance coil having its upper end connected electrically to said extended portion of said inner coaxial conductor near the hole therein and having its lower end connected to ground, said current sampling means including a wire conductor having one end connected electrically to said looped portion near one of said holes therein, said current sampling means also comprising a step-up transformer having its primary constituted by said looped portion of said inner coaxial conductor and having its secondary constituted by a multiturn coil formed by said wire conductor being inserted through one of said holes in said looped portion and being threaded several times around through the inside of said hollow looped portion in and out of the two holes therein for multiplying said potential drop, the unconnected end of said wire conductor being threaded through said extended portion of said inner coaxial conductor and out of said hole therein and being threaded through said hollow inductance coil and having a portion extending beyond the grounded end of said hollow inductance coil, a detector circuit, first connecting means for electrically connecting said detector circuit to said extended portion of said wire conductor, and second connecting means for electrically connecting said detector circuit to said hollow inductance coil near its grounded end.

6. An impedance monitor for obtaining an indication representative of the magnitude of a change in the input impedance of a low frequency coaxial transmission line having a hollow inner conductor, a portion of said inner conductor being bent in the form of a loop, said impedance monitor comprising a first inductance coil constituted by a hollow electrically conductive tube bent into the shape of a helix and having one end connected electrically to said inner conductor, a second inductance coil constituted by an electrically conductive wire threaded through the looped portion of said hollow inner conductor several times and having one end connected electrically to said inner conductor and having its other end threaded through said hollow tube, a resistor, a capacitor, a direct-current meter, and a rectifier having its input coupled to the first inductance coil by said resistor and to the second inductance coil by said capacitor and having its output connected to said meter.

7. An impedance monitor for obtaining an indication representative of the magnitude of a change in the input impedance of a low frequency coaxial transmission line having a hollow inner conductor, a portion of said inner conductor being formed in the shape of a loop for producing a potential drop, said monitor comprising in combination first sampling means for deriving samples of the voltage across the coaxial line, said first sampling means including a hollow electric conductor bent into the shape of a helical coil and having one end connected electrically to said inner coaxial conductor and having its other end connected to ground, second sampling means for deriving samples of the current fed into the coaxial line, said second sampling means including a wire electric conductor threaded through the inside of said looped portion of said hollow inner conductor and having one end connected electrically to said looped portion and having its other end threaded through the inside of said hollow coiled conductor and extending from the grounded end thereof, and a null detector circuit having a capacitor connected electrically to said wire conductor at said extended portion thereof and also having a resistor connected electrically to said helically coiled conductor near its grounded end.

8. In a low frequency radio transmitting system comprising a low frequency radio transmitter and a load circuit connected thereto by a coaxial transmission line, an impedance monitor for continuously monitoring the input impedance of said coaxial transmission line to detect the occurrence of a mismatch between the impedance of said transmission line and the impedance of said load circuit, said coaxial transmission line including a hollow inner conductor having a portion thereof bent in the form of a loop for producing a potential drop, said monitor comprising in combination first sampling means for deriving samples of the voltage across the coaxial line, said first sampling means including a hollow electric conductor bent into the shape of a helical coil and having one end connected electrically to said inner coaxial conductor and having its other end connected to ground, second sampling means for deriving samples of the current fed into the coaxial line, said second sampling means including a wire electric conductor threaded several times through the inside of said looped portion of said hollow inner conductor and having one end connected electrically to said looped portion and having its other end threaded through the inside of said hollow coil conductor and extending from the grounded end thereof, and a null detector circuit including a rectifier and also including instrumentalities for normally supplying said rectifier with said current and voltage samples in opposite phase and equal magnitudes for normally producing a null condition in said detector circuit, first connecting means for electrically connecting one of said instrumentalities to said wire conductor at said extended portion thereof, and second connecting means for electrically connecting another of said instrumentalities to said helically coiled conductor near its grounded end.

WILLIAM H. DOHERTY.

REFERENCES CITED

The following references are of record in the file of this patent:

UNITED STATES PATENTS

| Number | Name | Date |
|---|---|---|
| 2,027,214 | Wideroe | Jan. 7, 1936 |
| 2,165,848 | Gothe et al. | July 11, 1939 |
| 2,462,799 | Young et al. | Feb. 22, 1949 |